(12) United States Patent
Lacy et al.

(10) Patent No.: US 6,528,192 B2
(45) Date of Patent: Mar. 4, 2003

(54) RESIDUAL FUEL DISSIPATION FOR A FUEL CELL STACK

(75) Inventors: Robert A. Lacy, Scotia, NY (US); David E. James, Latham, NY (US)

(73) Assignee: Plug Power Inc., Latham, NY (US)

( * ) Notice: Subject to any disclaimer, the term of this patent is extended or adjusted under 35 U.S.C. 154(b) by 85 days.

(21) Appl. No.: 09/726,798

(22) Filed: Nov. 30, 2000

(65) Prior Publication Data

US 2002/0064693 A1 May 30, 2002

(51) Int. Cl.[7] .................................................. H01M 8/00
(52) U.S. Cl. .............................. 429/13; 429/12; 429/22
(58) Field of Search .............................. 429/12, 13, 22

(56) References Cited

U.S. PATENT DOCUMENTS 3,753,780 A * 8/1973 Fetterman ..................... 429/23

FOREIGN PATENT DOCUMENTS

WO    WO 99/44251    * 2/1999  ............ H01M/8/04

* cited by examiner

*Primary Examiner*—Carol Chaney
*Assistant Examiner*—Dah-Wei D. Yuan
(74) *Attorney, Agent, or Firm*—Trop, Pruner & Hu, P.C.

(57) ABSTRACT

An apparatus includes a fuel cell subsystem, a first circuit and a second circuit. The fuel cell subsystem produces power for a load in response to receiving a flow of a reactant, and the first circuit is coupled to the fuel cell subsystem to halt the flow to the fuel cell stack and isolate the fuel cell stack from the load after the flow is halted. The second circuit monitors a characteristic of the fuel cell subsystem and receives power from the stack to dissipate a portion of the reactant that remains in the stack while the flow is halted.

27 Claims, 3 Drawing Sheets

RESIDUAL FUEL DISSIPATION FOR A FUEL CELL STACK

BACKGROUND

The invention generally relates to residual fuel dissipation for a fuel cell stack.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

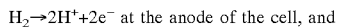

$H_2 \rightarrow 2H^+ + 2e^-$ at the anode of the cell, and

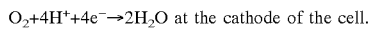

$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM. The PEM and its adjacent pair are often assembled together in an arrangement called a membrane electrode assembly (MEA).

A fuel cell system may automatically or manually be shut down for purposes of repairing the system or for performing routine maintenance on the system. However, such a shut down may pose problems due to the residual fuel that is left in the fuel cell stack after the shut down. For example, the residual fuel is effectively potential energy that may deliver an electrical shock to a technician attempting to service the system. As another example of the problems posed by the residual fuel, the residual fuel may not satisfy the appropriate stoichiometric ratios and thus, may cause some of the cells of the fuel cell stack to exhibit negative voltages and enter unstable and potentially unsafe states in which these cells may produce hydrogen on the wrong side of the cells.

Thus, there is a continuing need for an arrangement and/or technique to address one or more of the problems that are recited above.

SUMMARY

In an embodiment of the invention, an apparatus includes a fuel cell subsystem, a first circuit and a second circuit. The fuel cell subsystem produces power for a load in response to receiving a flow of a reactant, and the first circuit is coupled to the fuel cell subsystem to halt the flow to the fuel cell stack and isolate the fuel cell stack from the load after the flow is halted. The second circuit monitors a characteristic of the fuel cell subsystem and receives power from the stack to dissipate a portion of the reactant that remains in the stack while the flow is halted.

Advantages and other features of the invention will become apparent from the following description, from the drawing and from the claims.

DETAILED DESCRIPTION

Figure 2:
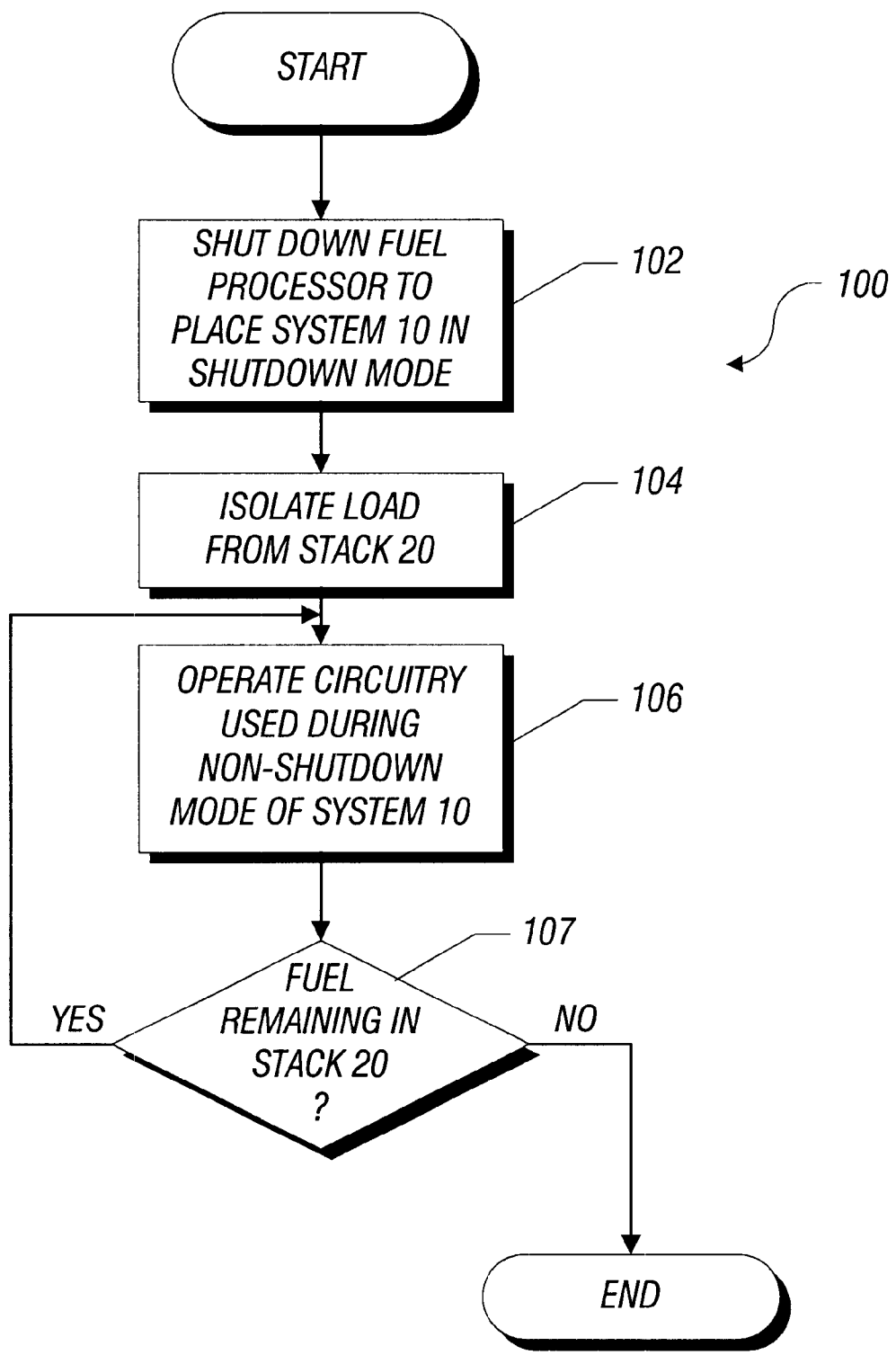
FIG. 2 is a flow diagram depicting a technique to dissipate residual fuel of a fuel cell stack of the system of FIG. 1 according to an embodiment of the invention.

Referring to FIG. 2, an embodiment of a fuel cell system 10 in accordance with the invention includes a fuel cell stack 20 that, when the system 10 is in a power production mode, is capable of producing power for a load 50 (a residential load, for example) in response to reactant fuel and oxidant flows that are provided by a fuel processor 22 and an air blower 24, respectively. It is possible that over the normal course of operation of the fuel cell system 10, the system 10 may transition from the power production mode to a shut down mode, a mode in which the system 10 shuts off the fuel processor 22 and the air blower 24 to halt the flows of oxidant and fuel to the fuel cell stack 20.

In the shut down mode, the fuel cell system 10 opens a switch 29 (a relay, for example) to break an electrical connection between the fuel cell stack 20 and the load 50 and thus, isolate the load 50 from the stack 20. The shut down mode may be needed, for various reasons, such as for purposes of shutting off power production from the fuel cell system 10 so that repairs or routine maintenance may be performed on the system 10.

It is possible that even though the fuel processor 22 is shut down, residual fuel may remain in the fuel cell stack 20 for a significant period of time, if not for the safety scheme that is imposed by the system 10, as described below. Thus, described herein is a safety scheme for rapidly removing the residual fuel from the fuel cell stack 20 to quickly bring the stack 20 into a safe state.

For purposes of dissipating the residual fuel in the stack 20, one such safety scheme, or technique, in accordance with the invention, includes the continued operation of circuitry of the system 10 after the system 10 enters the shut down mode. In this manner, this circuitry may be used to perform some function during the power production mode of the system 10. For example, the circuitry may be used to monitor a characteristic (cell voltages, for example) of the fuel cell stack 20, monitor other operations of the fuel cell system 10 and/or generally aid in controlling the operation of the system 10 during the power production mode of the system 10. To perform these functions, the circuitry draws power from the fuel cell stack 20. Although during the shut down mode the circuitry may not be used to perform the functions that the circuitry performs during the power production mode, the circuitry continues to serve as a power sink during the shut down mode to dissipate the residual fuel in the fuel cell stack 20.

A possible advantage of this arrangement is that because of the rapid dissipation of the residual fuel, the fuel cell stack 20 may reach a safe state more rapidly than stacks of conventional fuel cell systems. Other and different advantages are possible.

More specifically, in some embodiments of the invention, the above-described circuitry may include a cell voltage monitoring circuit 18. The cell voltage monitoring circuit 18 is coupled to one or more of the cell terminals of the fuel cell stack 20 (via electrical lines 21) to receive its operating power and to receive indications of the cell voltages. In this manner, during the power production mode of the system 10, the circuit 18 scans the cell voltages of the stack 20 and provides indications of the cell voltages and/or status of the stack 20 to a system controller 16 (of the system 20) via a serial bus 19. As an example, the controller 16 may include a microcontroller or microprocessor.

When a conventional fuel cell system transitions from its power production mode into the shut down mode, the conventional system powers down all circuitry that is used to operate the system in the power production mode. In this manner, the conventional system may include a power good circuit to generate a power status signal that shuts down such circuitry when the terminal voltage of the stack decreases below a predefined operating level.

However, unlike conventional arrangements, the fuel cell system 10 permits the cell voltage monitoring circuit 18 to continue to operate in the shut down mode, as if the system 10 were in the power production mode. As the residual fuel in the fuel cell stack 20 dissipates, the terminal voltage of the stack 20 decreases to the point where the supply voltage or voltages that are received by the cell voltage monitoring circuit 18 may fall out of regulation, thereby causing the cell voltage monitoring circuit 18 to behave erratically. However, during the shut down mode, the purpose of the continued operation of the cell voltage monitoring circuit 18 is to draw power to dissipate the residual fuel in the fuel cell stack 20. Therefore, the controller 16 is programmed to ignore the voltages and/or stack status that is indicated by the cell voltage monitoring circuit 18 during the shut down mode.

In some embodiments of the invention, the fuel cell system 10 performs a technique 100 that is depicted in FIG. 2 to dissipate the residual fuel. As an example, the controller 16 may store a program 17 (in a memory of the controller 16, for example) that the controller 16 executes to control the appropriate circuitry to perform the technique 100. In this manner, the program 17 may be a routine that the controller 16 executes when the fuel cell system 10 is to be automatically or manually shut down. As examples, this shut down may be needed to prepare the fuel cell system 10 for scheduled maintenance or the shut down may be in response to a detected failure of the system 10. Other reasons for the shut down of the fuel cell system 10 are possible.

Thus, upon executing the program 17, the controller 16 shuts down (block 102 of FIG. 2) the fuel processor 22 to halt the flow of fuel to the fuel cell stack 20 and place the fuel cell system 10 in the shut down mode. The controller 16 also isolates (block 104) the load 50 from the fuel cell stack 20. For example, in some embodiments of the invention, the controller unit 16 may open (via a switch control line 31) the switch 29, a switch that is coupled to a main output terminal 39 of the stack 20 and controls when power is routed from the fuel cell stack 20 to the load 50. In this manner, the output terminal 39 provides a stack terminal voltage (called $V_{TERM}$) that power conditioning circuitry 41 of the system 10 receives and converts to the appropriate AC voltage for the load 50. Because the switch 29 is coupled between the terminal 39 and this power conditioning circuitry 41, the opening of the switch 29 isolates the load 50 from the fuel cell stack 20, and the closing of the switch 29 couples the load 50 to the fuel cell stack 20.

Therefore, when the controller 16 opens the switch 29, the power conditioning circuitry 41 becomes disabled. However, the voltage monitoring circuit 18 continues to operate and thus, continues to draw power from the stack 20 to dissipate the residual fuel. Although the power that is provided by the stack 20 may eventually be insufficient to keep the cell voltage monitoring circuit 18 functioning properly, the circuit 18 continues to draw power until the residual fuel is dissipated, as depicted in diamond 107 of FIG. 2.

Figure 1:
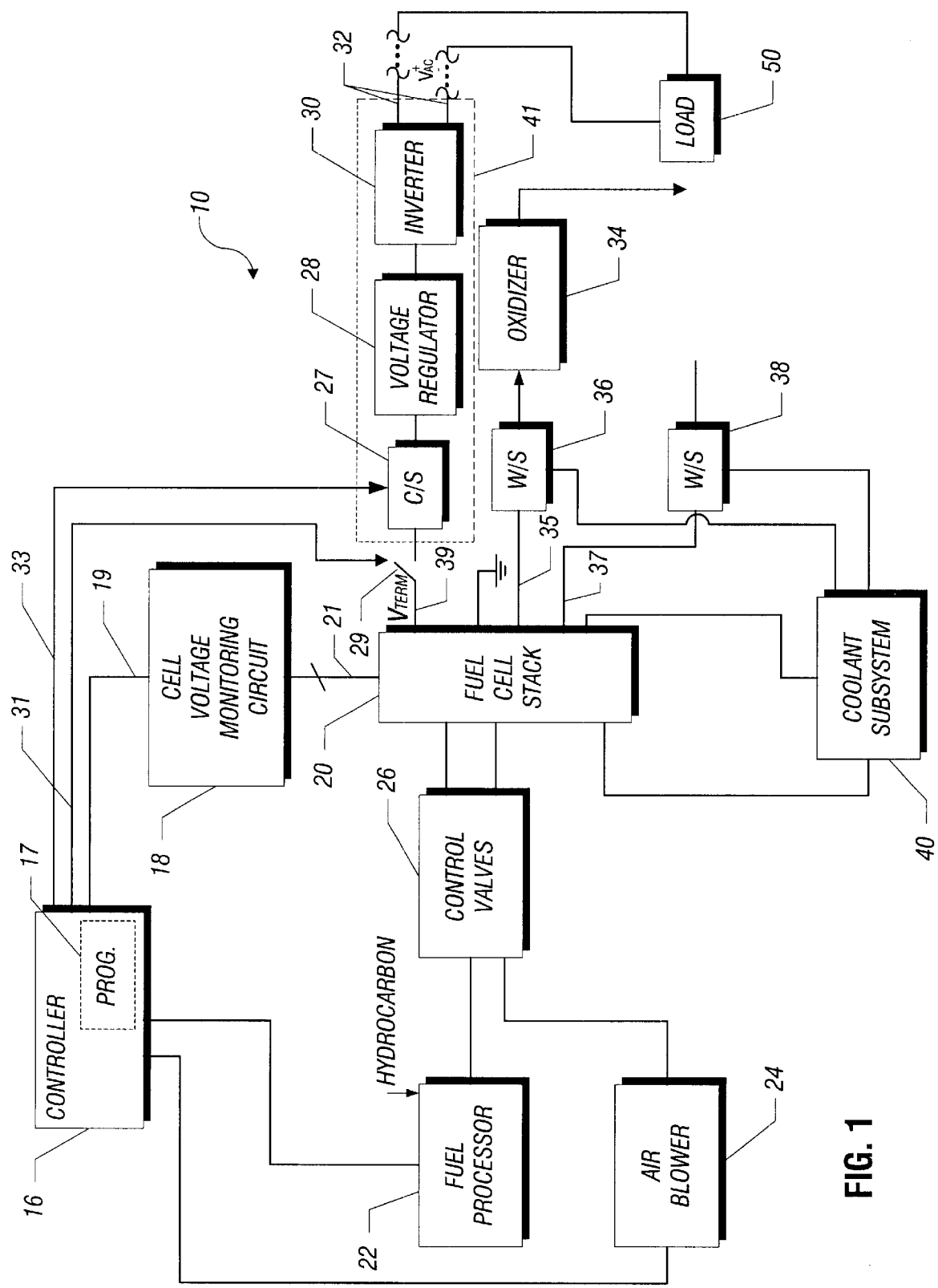
FIG. 1 is a schematic diagram of a fuel cell system according to an embodiment of the invention.

Referring to FIG. 1, in some embodiments of the invention, the power conditioning circuitry 41 includes a current sensor 27 that is coupled to the terminal switch 29 opposite from the terminal 39. Thus, when the switch 29 is closed, the current sensor 27 provides (via an electrical line 33) an indication of the current being drawn from the fuel cell stack 20. Therefore, via the current sensor 27 and the cell voltage monitoring circuit 18, the controller 16 may monitor the cell voltages and states of the stack 20 during the power production mode.

A voltage regulator 28 of the power conditioning circuitry 41 has its input terminal coupled to the output terminal of the current sensor 27. When the system 10 is in the power production mode, the voltage regulator 28 receives approximately the $V_{TERM}$ DC voltage from the terminal 39 of the fuel cell stack 20 and converts this DC input voltage into a regulated DC output voltage that the regulator 28 provides to an inverter 30 (of the power conditioning circuitry 41). Output terminals 32 of the inverter 30 furnish an AC wall voltage to the load 50.

Among the other features of the fuel cell system 10, in some embodiments of the invention, the system 10 includes a coolant subsystem 40 that circulates a coolant through the fuel cell stack 20 to regulate a temperature of the stack 20. The coolant subsystem 40 receives its operating power from the fuel cell stack 20 and may be shut down when the fuel cell system 10 enters the shut down mode, in some embodiments of the invention. The fuel cell system 10 may also include control valves 26 that regulate the oxidant and air flows into the fuel cell stack 20 and provide for emergency shut off of the flows. The fuel cell system 10 may also include gas/water separators 36 and 38 to remove water from flows of the system 10, such as the outlet oxidant and fuel flows from the fuel cell stack 20, for example. The gas/water separators 36 and 38 may route the collected water to a water tank of the coolant subsystem 40, in some embodiments of the invention. The fuel cell system 10 may also include an oxidizer 34 to oxidize exhaust fuel (from the fuel cell stack 20) that is not consumed in cell reactions.

Figure 3:
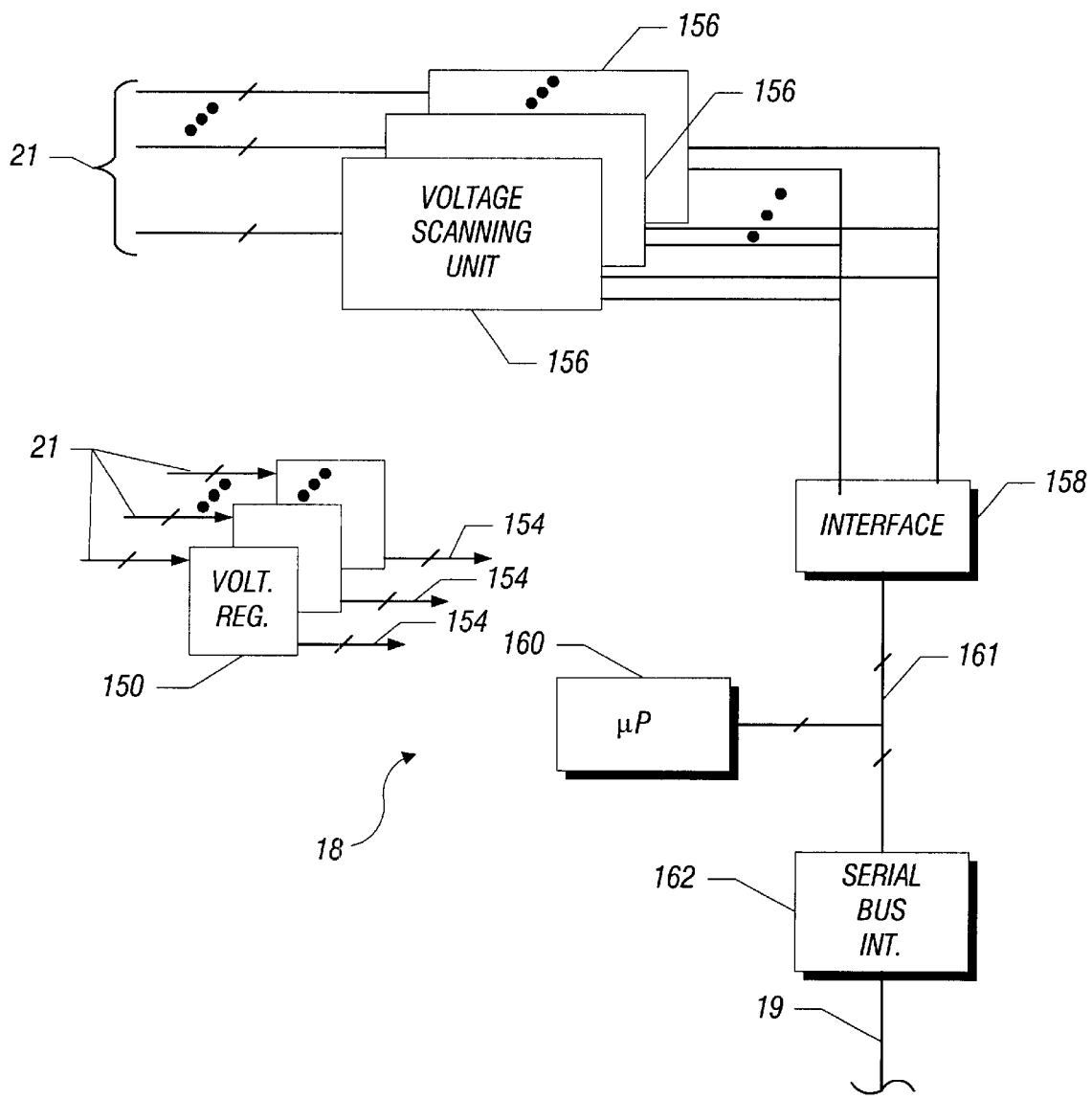
FIG. 3 is a schematic diagram of a cell voltage measuring circuit of the system of FIG. 1 according to an embodiment of the invention.

Referring to FIG. 3, in some embodiments of the invention, the cell voltage monitoring circuit 18 may include several voltage regulators 150, each of which receives an input voltage formed from the voltage across one or more cells and forms a DC voltage at its output terminal 154. The voltages at the output terminals 154, in turn, are received by various components of the cell voltage monitoring circuit 18 to power these components. As an example, these components may include voltage scanning units 156, each of which scans the voltages of a particular group of cells. The voltage scanning units 156 may have grounds that are referenced to different cell terminals of the fuel cell stack 20, as described in U.S. Pat. No. 6,140,820, entitled, "MEASURING CELL VOLTAGES OF A FUEL CELL STACK," granted on Oct. 31, 2000. The cell voltage monitoring circuit 18 may also include an interface 158 that receives indications of the scanned voltages from the voltage scanning units 156. This interface 158 may be coupled to a serial bus interface 162 (via a bus 161) of the circuit 18. In this manner, a microprocessor 160 (of the circuit 18) may be coupled to the bus 161 to control the serial bus interface 162 to communicate indications of the cell voltages and/or the status of the stack 20 over the serial bus 19 to the controller 16.

Other embodiments are within the scope of the following claims. For example, circuitry other than the cell voltage measuring circuit 18 may be used to dissipate the residual fuel in other embodiments of the invention. In this manner, the circuitry may operate to perform some function in the power production mode and operate in the shut down mode to dissipate the residual fuel in the fuel cell stack 20.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   providing a flow of a reactant to a fuel cell stack to cause the fuel cell stack to produce power for a load the fuel cell stack comprising at least one proton exchange membrane fuel cell;
   during the act of providing the reactant flow, powering circuitry with the fuel cell stack and using the circuitry to perform a function associated with operating the fuel cell stack;
   halting the reactant flow to the fuel cell stack;
   isolating the fuel cell stack from the load in response to the halting; and
   continuing to operate the circuitry in response to the halting to dissipate a portion of the reactant remaining inside the fuel cell stack.

2. The method of claim 1, wherein the using the circuitry comprises:
   using the circuitry to monitor a characteristic of the stack.

3. The method of claim 2, wherein the characteristic comprises a voltage associated with the stack.

4. The method of claim 1, wherein the reactant comprises a fuel.

5. The method of claim 1, wherein the reactant comprises hydrogen.

6. The method of claim 1, wherein the act of continuing to operate the circuitry comprises:
   ignoring output signals provided by the circuitry.

7. The method of claim 1, further comprising:
   controlling the flow in response to the act of using the circuitry.

8. The method of claim 1, wherein the act of isolating comprises:
   operating a switch to isolate the load from the stack.

9. The method of claim 1, wherein the act of isolating comprises:
   isolating a power conditioning circuit from the stack.

10. A system comprising:
    a fuel source to provide a flow of a reactant;
    a fuel cell stack to receive the flow and produce power for a load in response to receiving the flow the fuel cell stack comprising at least one proton exchange membrane fuel cell;
    a first circuit to interact with the fuel source to halt the flow to the fuel cell stack and isolate the fuel cell stack from the load after the flow is halted; and
    a second circuit to perform a function associated with operating the fuel cell stack when the flow of the reactant is provided to the fuel cell stack and to dissipate a portion of the reactant that remains in the stack while the flow is halted.

11. The system of claim 10, wherein the fuel source comprises a fuel processor.

12. The system of claim 10, wherein the first circuit comprises:
    a switch coupled between the stack and the load.

13. The system of claim 10, wherein the first circuit comprises:
    a controller to use the second circuit to control operation of the stack.

14. The system of claim 10, wherein the second circuit comprises:
    circuitry to monitor a characteristic of the stack.

15. The system of claim 10, wherein the second circuit comprises a cell voltage monitoring circuit.

16. The system of claim 10, wherein the reactant comprises a fuel.

17. The system of claim 10, wherein the reactant comprises hydrogen.

18. The system of claim 10, wherein the first circuit comprises:
    a controller to regulate operation of the stack based on an indication provided by the second circuit while the flow is received by the stack and ignore the indication after the flow is halted.

19. The system of claim 10, further comprising:
    a power conditioning circuit to receive a DC voltage from the stack and provide an AC voltage to the load, wherein the first circuit isolates the power conditioning circuitry from the stack to isolate the load from the stack.

20. The system of claim 19, wherein the power conditioning circuit comprises an inverter.

21. The system of claim 19, wherein the power conditioning circuit comprises a voltage regulator.

22. An apparatus comprising:
    a fuel cell subsystem to produce power for a load in response to receiving a flow of a reactant;
    a first circuit coupled to the fuel cell subsystem to halt the flow to a fuel cell stack and isolate the fuel cell stack from the load after the flow is halted the fuel cell stack compromising at least one proton exchange membrane fuel cell; and
    a second circuit to monitor a characteristic of the fuel cell subsystem and receive power from the stack to dissipate a portion of the reactant that remains in the stack while the flow is halted.

23. The apparatus of claim 22, wherein the first circuit comprises:
    a switch coupled between the stack and the load.

24. The apparatus of claim 22, wherein the first circuit comprises:

a controller to use the second circuit to control operation of the stack.

25. The apparatus of claim 22, wherein the second circuit comprises a cell voltage monitoring circuit.

26. The apparatus of claim 22, wherein the first circuit comprises:

a controller to regulate operation of the stack based on an indication provided by the second circuit while the flow is received by the stack and ignore the indication after the flow is halted.

27. The apparatus of claim 22, further comprising:

a power conditioning circuit to receive a DC voltage from the stack and provide an AC voltage to the load, wherein the first circuit isolates the power conditioning circuitry from the stack to isolate the load from the stack.

* * * * *